(12) United States Patent
Neumann

(10) Patent No.: US 11,488,600 B2
(45) Date of Patent: Nov. 1, 2022

(54) EFFICIENT DIALOGUE CONFIGURATION

(71) Applicant: GK Easydialog, Tokyo (JP)

(72) Inventor: Christoph Neumann, Würzburg (DE)

(73) Assignee: GK Easydialog, Tokyo (JP)

( * ) Notice: Subject to any disclaimer, the term of this patent is extended or adjusted under 35 U.S.C. 154(b) by 0 days.

(21) Appl. No.: 17/059,110

(22) PCT Filed: May 26, 2019

(86) PCT No.: PCT/EP2019/025156
§ 371 (c)(1),
(2) Date: Nov. 25, 2020

(87) PCT Pub. No.: WO2019/228667
PCT Pub. Date: Dec. 5, 2019

(65) Prior Publication Data
US 2021/0210092 A1 Jul. 8, 2021

(30) Foreign Application Priority Data
May 29, 2018 (EP) ...................................... 18000483

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/18* (2013.01); *G10L 2015/088* (2013.01); *G10L 2015/223* (2013.01)

(58) Field of Classification Search
None
See application file for complete search history.

(56) References Cited

U.S. PATENT DOCUMENTS 7,949,530 B2 * 5/2011 Huang ................... G10L 15/22
704/270.1
9,466,294 B1 * 10/2016 Tunstall-Pedoe ....... G10L 15/22
(Continued)

FOREIGN PATENT DOCUMENTS

DE 60030920.7 T2 11/2006
DE 102012019178 A1 4/2013
(Continued)

OTHER PUBLICATIONS

"International Application No. PCT/EP2019/025156, International Search Report and Written Opinion dated Jul. 17, 2019", (dated Jul. 17, 2019), 14 pgs.
(Continued)

*Primary Examiner* — Jonathan C Kim
(74) *Attorney, Agent, or Firm* — Schwegman Lundberg & Woessner, P.A.

(57) ABSTRACT

The invention relates to a method for an efficient dialogue configuration and interpretation in a computer-supported automated dialogue system. The invention offers, inter alia, the advantage that the work complexity when generating dialogues, and thus also the error propensity, is reduced. Furthermore, it is possible to take the context of sub-dialogs into consideration and dynamically generate a dialogue depending on said context. Furthermore, the method can automatically initiate a dialogue with a human user. The invention further relates to a correspondingly designed system assembly and to a computer program product with control commands which carry out the method or operate the system assembly.

11 Claims, 5 Drawing Sheets

(51) Int. Cl.
  *G10L 15/18* (2013.01)
  *G10L 15/08* (2006.01)

(56) References Cited

U.S. PATENT DOCUMENTS

| | | | | |
|---|---|---|---|---|
| 10,418,032 | B1* | 9/2019 | Mohajer | G10L 15/1815 |
| 2005/0105712 | A1* | 5/2005 | Williams | G10L 13/027 |
| | | | | 704/275 |
| 2007/0094004 | A1* | 4/2007 | Huang | G10L 15/22 |
| | | | | 704/E15.04 |
| 2010/0049513 | A1* | 2/2010 | Huang | G10L 15/22 |
| | | | | 704/E15.001 |
| 2010/0131275 | A1* | 5/2010 | Paek | G10L 15/19 |
| | | | | 704/E15.001 |
| 2011/0238408 | A1* | 9/2011 | Larcheveque | G06F 40/211 |
| | | | | 704/9 |
| 2014/0180695 | A1* | 6/2014 | Beckman | G06F 40/56 |
| | | | | 704/258 |
| 2015/0134337 | A1* | 5/2015 | Seo | G06F 16/243 |
| | | | | 704/254 |
| 2015/0279366 | A1* | 10/2015 | Krestnikov | G10L 15/26 |
| | | | | 704/235 |
| 2016/0259709 | A1* | 9/2016 | Anand | G06F 16/248 |
| 2017/0060839 | A1 | 3/2017 | Kawamura | |
| 2017/0069316 | A1* | 3/2017 | Makino | G10L 15/22 |
| 2017/0116982 | A1 | 4/2017 | Gelfenbeyn et al. | |
| 2017/0125008 | A1* | 5/2017 | Maisonnier | G10L 13/0335 |
| 2017/0371861 | A1* | 12/2017 | Barborak | G06F 16/22 |
| 2018/0052913 | A1* | 2/2018 | Gaskill | G06N 5/02 |
| 2018/0131642 | A1* | 5/2018 | Trufinescu | G10L 13/08 |
| 2018/0212904 | A1* | 7/2018 | Smullen | H04L 51/02 |
| 2018/0261223 | A1* | 9/2018 | Jain | G10L 15/26 |
| 2018/0278740 | A1* | 9/2018 | Choi | G06F 3/04847 |
| 2018/0316630 | A1* | 11/2018 | Jacobson | H04L 67/60 |
| 2018/0336896 | A1* | 11/2018 | McGann | H04M 3/493 |
| 2018/0358006 | A1* | 12/2018 | McConnell | G06F 40/295 |
| 2019/0026346 | A1* | 1/2019 | Li | G06F 16/90332 |
| 2019/0172444 | A1* | 6/2019 | Hiroe | G10L 15/005 |
| 2019/0182072 | A1* | 6/2019 | Roe | H04N 21/44218 |
| 2019/0182382 | A1* | 6/2019 | Mazza | H04L 51/02 |
| 2019/0228068 | A1* | 7/2019 | Sen | G06F 40/30 |
| 2019/0228107 | A1* | 7/2019 | Trim | G06F 16/90332 |
| 2019/0251966 | A1* | 8/2019 | Dharne | G06N 5/02 |
| 2019/0325868 | A1* | 10/2019 | Lecue | G10L 25/63 |
| 2020/0160187 | A1* | 5/2020 | Escott | G06N 5/04 |
| 2021/0043194 | A1* | 2/2021 | Krishnamurthy | G06F 16/3329 |

FOREIGN PATENT DOCUMENTS

| | | |
|---|---|---|
| DE | 112016003335 T5 | 4/2018 |
| WO | WO-2019228667 A1 | 12/2019 |

OTHER PUBLICATIONS

"International Application No. PCT/EP2019/025156, English Translation of International Preliminary Report on Patentability dated Dec. 3, 2020", (dated Dec. 3, 2020), 7 pgs.

"International Application No. PCT/EP2019/025156, International Preliminary Report on Patentability dated May 4, 2020", German only, (dated May 4, 2020), 39 pgs.

* cited by examiner

EFFICIENT DIALOGUE CONFIGURATION

PRIORITY CLAIM TO RELATED APPLICATIONS

This application is a U.S. national stage filing under 35 U.S.C. § 371 from International Application No. PCT/EP2019/025156, filed on 26 May 2019, and published as WO2019/228667 on 5 Dec. 2019, which claims the benefit under 35 U.S.C. 119 to European Patent Application No. 18000483.0, filed on 29 May 2018, the benefit of priority of each of which is claimed herein, and which applications and publication are hereby incorporated herein by reference in their entirety.

The present invention relates to a method for efficient dialogue configuration and interpretation in a computer-assisted automated dialogue system. Among other things, the present invention has the advantage that the workload and thus also the error susceptibility are reduced in dialogue creation. Further, it is possible to take account of a context of sub-dialogues and to create a dialogue dynamically as a function of this context. Further, the proposed method can initiate a dialogue with a human user itself. The present invention further relates to a correspondingly set-up system arrangement and to a computer program product comprising control commands which carry out the method or operate the system arrangement.

US 2015/0134337 A1 discloses a conversation-based search system comprising a conversation scenario.

DE 10 2012 019 178 A1 discloses a computer program product for interpreting a user input so as to perform a task on a computing device having at least one processor.

DE 60 030 920 T2 discloses methods for collecting data, which are assigned to a voice of a user of a speech system, in connection with a data warehouse or data reservoir.

DE 11 2016 003 335 T5 discloses natural language processing (NLP) systems, and in particular NLP systems which include natural language generation (NLG) systems, which in turn include natural language translation (NLT) systems, natural language processing question-and-answer (NLP Q&A) systems, systems for dialogues in a natural language, and the like.

From the prior art, dialogue systems are known in which a machine system interacts with a human user and receives voice commands of the human user. Reactions to these commands are subsequently initiated, and the user receives a corresponding response. Systems of this type are known for example under the registered marks "Alexa" and "Siri". As well as in the infotainment sector, systems of this type are used for example in the automotive field, where the user can voice-control a navigation system or other functions.

The prior art further discloses devices which serve for example to convert sound into text and back again. Systems of this type are generally referred to as "speech recognition" systems. This may take place in such a way that the human user speaks a sentence and the received acoustic signals are subsequently assigned to a text by pattern matching. It is also known to provide a text which is subsequently converted into natural acoustic language. This method is generally referred to as "text-to-speech".

Further, interpretation of text is known, this taking place for example in the context of "natural language understanding". Methods of this type make it possible for keywords to be extracted from an existing text passage and subsequently further processed. Moreover, natural language processing techniques are known.

Conventional dialogue systems are implemented in such a way that the user provides an acoustic or text input which is converted into a text. Subsequently, a corresponding source code is actuated, which controls the further dialogue. In a dialogue control system or dialogue protocol of this type, it is stored which answer is given to which question. Moreover, it may be specified which action is performed in response to which command. For this purpose, a dedicated source text is provided for each dialogue and describes the dialogue progression in a hard-coded manner. Elements of this type which describe a dialogue have the drawback that in this case the entire dialogue has to be modelled and in particular the provided text elements also have to be stored. A dialogue of this type runs rigidly when it is newly started up. It is thus only possible with difficulty to incorporate contextual knowledge, and the dialogue typically runs identically each time.

Moreover, there is the drawback that individual hard-coded dialogues of this type are complex to implement, since a dedicated dialogue has to be created in advance for every request and every dialogue branch. This results in a further problem whereby an extensive source code arises for this purpose and has to be correspondingly tested. This testing is work-intensive and also potentially error-susceptible. In addition, the user often does not experience an intuitive dialogue progression, since the dialogues are already fixedly determined in advance.

Therefore, an object of the present invention is to propose an improved method for efficient dialogue configuration and interpretation which makes it possible for dynamic dialogues to occur which can progress individually as a function of a user input. The proposed method should be dynamically constructed in such a way that dialogue elements can be selected and used for the runtime. Moreover, an object of the present invention is to provide a correspondingly set-up system arrangement and a computer program product comprising control commands which implement the proposed method or operate the proposed system arrangement.

The object is achieved by the features of claim 1. Further advantageous embodiments are set out in the dependent claims.

Accordingly, a method for efficient dialogue configuration and interpretation in a computer-assisted automated dialogue system is proposed, time storing a plurality of dialogue protocols for in each case at least two keywords, the dialogue protocols each specifying a dynamic sequence of a dialogue and the dynamic sequence of the dialogue describing sub-dialogues which are composed by way of branch points, the dialogue protocol specifying a presence of dialogue units and a dialogue progression which places the dialogue units in time sequence; selecting a dialogue protocol as a function of at least two keywords provided at runtime, at least the first keyword being provided by means of an acoustic user input using a technology for understanding a natural language, which detects from a pitch of the acoustic user input whether this is a question or a statement, and further at least one second keyword is provided by way of a control command, the user selecting at least the first keyword and the control command modelling a context of the selected keyword for this purpose and thus providing the at least second keyword, whereupon the corresponding dialogue protocol is selected; assigning text elements to dialogue units of the dialogue protocol; and executing the dialogue protocol at the runtime.

In this context, a person skilled in the art will appreciate that the method steps may be carried out iteratively and/or in a different order. In addition, the individual steps may comprise sub-steps. Thus, for example, the storing of a plurality of dialogue protocols may take place iteratively, and new dialogue protocols may constantly be added. The assignment of text elements to dialogue units of the dialogue protocol may be carried out at runtime, in other words during the dialogue, or else even in advance. Executing the dialogue protocol at the runtime comprises a plurality of sub-steps such as are provided for example in the speech recognition process or natural language understanding process.

In particular, the proposed method comprises known techniques, which are not cited herein because they are implemented on the basis of conventional components. Thus, according to the invention, the user typically inputs an acoustic question or answer and subsequently also receives an acoustic answer or question. This involves the acoustic signals, in other words the speech, being converted into a text and subsequently an output text also being converted back into speech in the machine answer. This results in a dialogue system which communicatively interacts with the user. The invention also relates to text dialogue systems, for example chat bots.

The proposed method is an efficient method, since according to the invention the dialogue protocols are decoupled from the individual text elements. In this way, it is possible for dialogues not to have to be stored hard-coded and thus to have to be created individually in each case. Thus, the invention overcomes the drawback of the prior art whereby, in conventional methods, the dialogue configuration runs in such a way that the text elements are already embedded in the source code. By contrast, according to the invention, it is possible for dialogue protocols which dynamically compose individual dialogues to be provided and additionally for the text elements to be able to be decoupled. Moreover, interpretation of the dialogues is possible, since the dialogue progression can be investigated in a situation-specific manner, and not only keywords provided by the user himself can be used as a user input, but rather control commands can produce corresponding keywords. Keywords may also be generated by the dialogue protocol as a function of the context (in which case no external control command need be present). For example, if the question has been misunderstood twice, there is an automatic redirect to a replacement question.

The proposed method runs in a computer-assisted and automated manner, in such a way that the proposed method can interact spontaneously with a user, and thus the proposed system can also design dialogues itself by way of the dialogue protocols. As a result, all method steps are performed computationally, the user merely supplying an acoustic or text input.

To do this, a plurality of dialogue protocols are stored for at least one keyword each. Dialogue protocols are thus created which for example provide activities, placed in a temporal or logical connection with one another, as dialogue units. The dialogue protocols thus do not specify conventional, rigid sequences, but rather provide when an activity is performed by which actor, without fixing which text elements are used. This overcomes the drawback of the prior art whereby there is linking of dialogue logic and text elements. The dialogue protocols specify for example that for a particular user input a query is made by the dialogue system. Moreover, dialogue protocols may specify that, if the user suggests a topic, corresponding keywords are extracted and subsequently the dialogue system has to ask a question. If it is detected that the user is himself asking a question, the dialogue protocol provides that the system searches for and provides a corresponding answer. Thus, a dialogue protocol corresponds to a dynamic sequence of a conversation or dialogue between the dialogue system and the user.

The dialogue protocols are provided in advance, in other words before runtime, and are thus already available if the dialogue is started. Thus, dialogue protocols can be referred to as abstract insofar as they do not comprise specific text elements, but rather provide which dynamic sequence the dialogue is to adopt.

Keywords, in other words one or more keywords, are assigned to the individual dialogue protocols. A keyword may for example be referred to as a topic about which the dialogue is held. Thus, conventional methods may be used which select a particularly prominent noun from a sentence. Thus, in one application scenario the user may ask for example for the weather, and subsequently the proposed method can extract by conventional methods the fact that the user is in fact asking for the weather. For this purpose, the intonation of the input may also be taken into account and it may subsequently be detected whether it is a statement or a question. If it is detected that a question about the weather is present, the corresponding keyword is thus "weather", and a dialogue system is selected which provides that the dialogue system asks a question and subsequently answers the initially asked question in response to an expected response from the user.

At this point, there are still no text elements provided, but merely the individual activities of the protocol. Thus, in response to the question about the weather, the proposed method can provide that a question relating to a particular location is asked by the dialogue system. Subsequently, the text element, "What location would you like to know the current weather for?" is assigned. Thereupon, the dialogue protocol can provide that the user has to answer. If a corresponding answer is provided, the location can be extracted from this, and thereupon it can in turn be provided that the dialogue system has to provide an answer. At this point, the keyword "weather" is available to the dialogue system, and subsequently for example the location "Munich" which is provided by the user. Using this information, the system can make a database query using a provided interface, and subsequently the dialogue protocol can provide that the dialogue system has to give an answer and the method terminates after the answer. Thus, the dialogue system can make the weather announcement and thus provide the read-out weather parameters from a database. Since this should typically answer the question in a satisfactory manner, the method can terminate.

However, a sub-dialogue protocol may also provide branching to another sub-dialogue protocol, and thus for example a dialogue protocol for the keyword "journey destination" may be selected. Thus, if the dialogue system has answered the question about the weather, the dialogue protocol can branch in such a way that a sub-dialogue protocol is selected which asks the user whether he wishes to make a journey in the event of good weather. The above-described method subsequently repeats, and, after a corresponding database query, activities suitable for the user may be proposed which fit both the topic of "weather" and the topic of "Munich". In this context, the system automatically explores the journey destination "Munich" from the preceding dialogue progression, without the user having to say it again. In this way, a dynamic sequence of a dialogue is created, and there is a decoupling of the dialogue protocol from the actual text elements.

According to the invention, there is additionally an assignment of text elements to dialogue units of the dialogue protocol, it being possible for this to take place at the runtime or in advance. The runtime is always the execution time of the dialogue per se. The invention overcomes the drawback that the provided source code provides both the text elements and the individual activities, in other words the dialogue units. Thus, the dialogue units of the dialogue protocol may be defined as abstract elements which provide that a dialogue system has to ask a question. How the question is then specifically to be asked is specified by the corresponding text element. This results in a further advantage over the prior art, whereby the proposed method is particularly language-independent. Thus, generic dialogue protocols can be created and text elements in all languages can be used for this purpose. Thus, a dialogue protocol may be used merely with German-language text elements. If the user now selects a different language, a new source code does not need to be used, but rather different, for example English-language text elements are merely assigned to the unchanged dialogue protocol. The system is thus also less high-maintenance than conventional systems, since the dialogue logic, in other words the dialogue protocols, are separated from the text content which is actually to be applied. Thus, when a system of this type is maintained or a method of this type is carried out, there is less complexity than in conventional systems and methods.

In addition, an existing dialogue protocol along with text elements may be ported unchanged into a new development environment (without rewriting source code or even converting it into a different programming language), so long as a DCS (dialogue control script) is available in the development environment.

Since the dialogue protocols have now been selected and a single dialogue protocol is present, for which the text elements are also present, it is now possible to carry out the dialogue or execute the dialogue protocol. The user is thus guided through the dynamic dialogue by way of the dialogue protocol, and receives corresponding details or questions whenever the dialogue protocol so provides. Since the dialogue protocol may also provide sub-protocols, it is possible to branch to a different sub-dialogue protocol at any time if the user gives a corresponding input. If for example the user has not been sufficiently informed, it is possible to pass into another dialogue which provides how else the user can be helped. For this purpose, the corresponding text elements are again selected and presented to the user.

In one aspect of the present invention, the dialogue protocol specifies a presence of dialogue units and a dialogue progression which places the dialogue units in time sequence. This has the advantage that a dialogue progression can be provided which is independent of text elements per se. The dialogue units merely provide when the proposed method is to act and when the user is to act. Moreover, it can be specified which activity specifically is provided as a dialogue unit. Thus, a dialogue unit may be an input by the user or by the dialogue system. Moreover, a dialogue unit may provide control commands which are to be handled at a particular point within the dialogue. Thus, according to the invention, two dialogue units which are both to be operated by the dialogue system may be placed in succession, a first database query initially taking place in the first dialogue unit, and it being specified in the second dialogue unit that the read-out information is to be provided to the user. The time sequence may be a flow chart, it generally also being possible for a logical sequence to be specified as an alternative to the time sequence. Thus, it may be provided that a user input always has to be waited for and subsequently answered. It is also possible for the dialogue units to provide that the dialogue system initiates the dialogue and the user subsequently answers.

In a further aspect of the present invention, the dialogue units are stored as alphanumeric parameters. This has the advantage that a memory-efficient and easily human-readable form in which the dialogue units are stored can be selected. Thus, the individual dialogue units can be swapped into a separate file and provided to the proposed method.

In a further aspect of the present invention, the dialogue units are stored in tabulated form. This has the advantage that the activities or actors can be entered in the columns and a continuous index, which can be referred to by a sub-dialogue protocol, can be entered in the rows. Thus, a dialogue can be dynamically created in such a way that the associated index is addressed, and at the end of the sub-dialogue protocol a further index is dynamically referenced, which is subsequently queried, and a further sub-dialogue can be carried out. Thus, the individual rows specify a sub-dialogue protocol which can be composed dynamically.

In a further aspect of the present invention, the keyword is provided by means of a user input and/or by a control command. This has the advantage that either the user may make an acoustic or text input, from which the keyword is extracted, or else control commands are carried out, which subsequently select the suitable dialogue protocol. Thus, for example, a macro can be created which in turn comprises a plurality of control commands. These control commands are set up to provide the keyword. A combination of a user input and a control command may be made in such a way that a user selects a first keyword and the control command models a context for this purpose, whereupon the corresponding dialogue protocol is selected.

In a further aspect of the present invention, the keyword is provided using a technology for understanding a natural language. This has the advantage that components which are already installed or implemented can be used for the natural language understanding. It is thus also possible for a user to make a user input acoustically, for this to be converted into text, and subsequently for one or more keywords to be extracted from this acoustic input. A further aspect according to the invention of NLU is a mapping from a set of different matchable keywords to one keyword (for example, "house", "building", "skyscraper" are all mapped to "house") or age ("43", "49" are both mapped to the age group "40-49"). In particular, this also includes many incorrect speech recognition results. Thus, in English, "cups" is pronounced almost the same as "cats" in many dialects, and so for example "cats" is used as a trigger for a system where it is desired to detect "cups".

In a further aspect of the present invention, each dialogue unit specifies an activity of an actor within the dialogue protocol. This has the advantage that the dialogue unit can specify whether a question, an answer or a control command is now to be provided. Corresponding actors are either the user with whom the dialogue is being held or else the dialogue system. In this context, further actors may also be used, such as an external database which is to be addressed by means of a control command.

In a further aspect of the present invention, the dynamic sequence of the dialogue specifies sub-dialogues, which are composed by way of branchings. This has the advantage that the dialogue can be created dynamically at the runtime, and subsequently corresponding protocols may likewise be used. In this context, the user input can be waited for and in turn a further sub-dialogue may be selected as a function of the user input. This results in dynamic composition of sub-dialogues into an overall dialogue at the runtime. This corresponds to composition of sub-dialogue protocols into a dialogue protocol.

In a further aspect of the present invention, a branching is selected as a function of a user input and/or by a control command This has the advantage that not only can the text user inputs be used, but rather a control command, such as a database query, can be instigated by means of a user input.

In a further aspect of the present invention, each dialogue unit predefines an activity of the dialogue system, an activity of a user, execution of control commands and/or termination of the method. This has the advantage that the individual activities can be specified, and these are not directed towards the dialogue system per se or the human user, but rather it can also be proposed which control commands are executed to answer the user input. Moreover, it can be specified at what time the dialogue protocol provides that the method terminates because the user request has been successfully answered.

In a further aspect of the present invention, the execution of the dialogue protocol at the runtime comprises operating an acoustic dialogue between the dialogue system and a user. This has the advantage that conventional components can be used which convert an acoustic input into text and subsequently convert a text output into acoustic information again.

In a further aspect of the invention, the method is executed on a mobile terminal, in a vehicle or on a stationary computing unit. This has the advantage that various application scenarios can be covered and all commonplace terminals can be operated. A stationary computing unit may for example be a conventional personal computer of a user. In use in a vehicle, a user interface which guides the driver through a dialogue is typically used.

In a further aspect of the present invention, interfaces to existing internet-based services are provided. This has the advantage that software components which are already implemented can be reused and internet services can be queried which provide information for answering the user requests or provide services such as shopping options.

The object is also achieved by a system arrangement for efficient dialogue configuration and interpretation in a computer-assisted dialogue system, select a runtime a storage unit set up to store a plurality of dialogue protocols for in each case at least two keywords, the dialogue protocols each specifying a dynamic sequence of a dialogue and the dynamic sequence of the dialogue describing sub-dialogues which are composed by way of branch points, the dialogue protocol specifying a presence of dialogue units and a dialogue progression which places the dialogue units in time sequence; a computing unit set up to select a dialogue protocol as a function of at least two keywords provided at runtime, the system being set up to provide at least the first keyword by means of an acoustic user input using a technology for understanding a natural language, which is set up to detect from a pitch of the acoustic user input whether this is a question or a statement, and the system arrangement further being set up to provide at least one second keyword by way of a control command, the user selecting at least the first keyword, and the control command, for this purpose, being set up to model a context of the selected keyword and thus to provide the at least second keyword, whereupon the corresponding dialogue protocol is selected; a further computing unit set up to assign text elements to dialogue units of the dialogue protocol; and a dialogue unit set up to execute the dialogue protocol at the runtime.

The object is also achieved by a computer program product comprising control commands which implement the proposed method or operate the proposed system arrangement.

According to the invention, it is particularly advantageous that the system arrangement provides structural features which functionally correspond to the individual method steps. Thus, the system arrangement serves to carry out the proposed method. The proposed method is in turn set up to operate the system arrangement. Thus, the method steps can also be mirrored as structural features of the system arrangement. The system arrangement comprises devices which are actually set up as stated above, and does not merely comprise generic components for suitability.

Further advantageous embodiments are described in greater detail by way of the accompanying drawings, in which.

Figure 1:
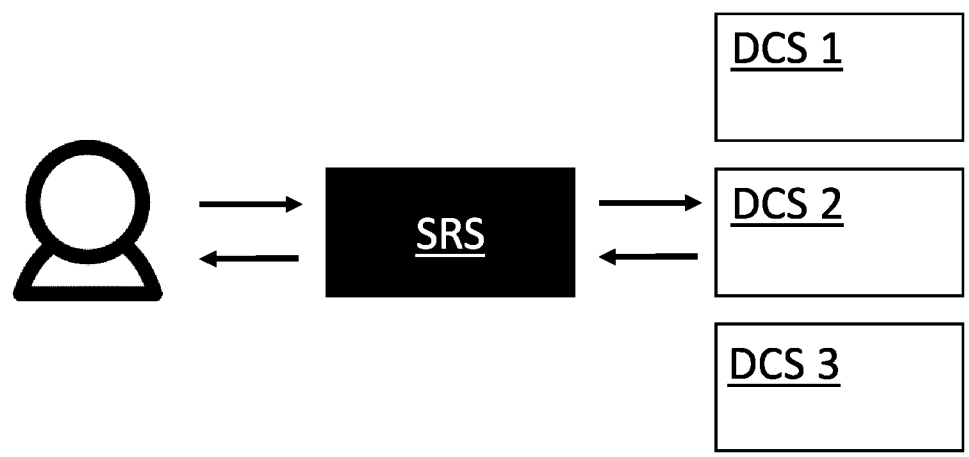
FIG. 1 shows a conventional dialogue system as a starting point for the present invention.

The left side of FIG. 1 shows a human user who is giving an input to a speech recognition system. A speech recognition system is a speech recognition service system SRS. As is shown on the right side, the individual dialogues are implemented separately, and in this context a sequence logic is specified which includes corresponding text elements. This is particularly disadvantageous because the dialogue protocols have to be linked to the text elements. As a result, separate maintenance cannot take place, and this results in increased technical complexity.

Figure 2:
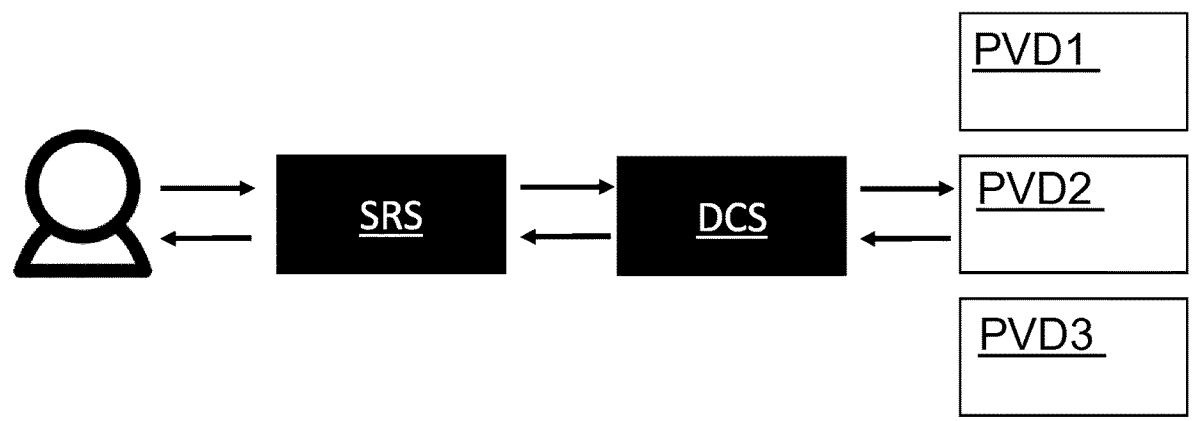
FIG. 2 shows a system arrangement for efficient dialogue configuration and interpretation in accordance with an aspect of the present invention.

FIG. 2 shows, in accordance with the invention, an adaptation of the system of FIG. 1, and in this context provides a further component, namely a selection unit, for example a dialogue control script unit DCS. This unit is upstream from the text elements on the right side, and subsequently at the runtime the corresponding dialogue can be selected and the text elements on the right side merely have to be integrated into the system. Thus, the invention overcomes the drawback that the dialogue protocols are not stored together with text elements in the three schematic units on the right side, as shown in FIG. 1, but rather the dialogue protocols are stored in the upstream unit DCS and merely the individual text elements have to be read in from the right side.

Alternatively, the individual dialogue protocols are not stored in the DCS, but are queried/read in by the DCS dynamically/at the run time. The additive component DCS thus creates specific dialogue progressions, and subsequently selects further parameters from the right side. Herein, PVD stands for parameter voice dialogue, for example PVD1, PVD2 and PVD3.

Figure 3:
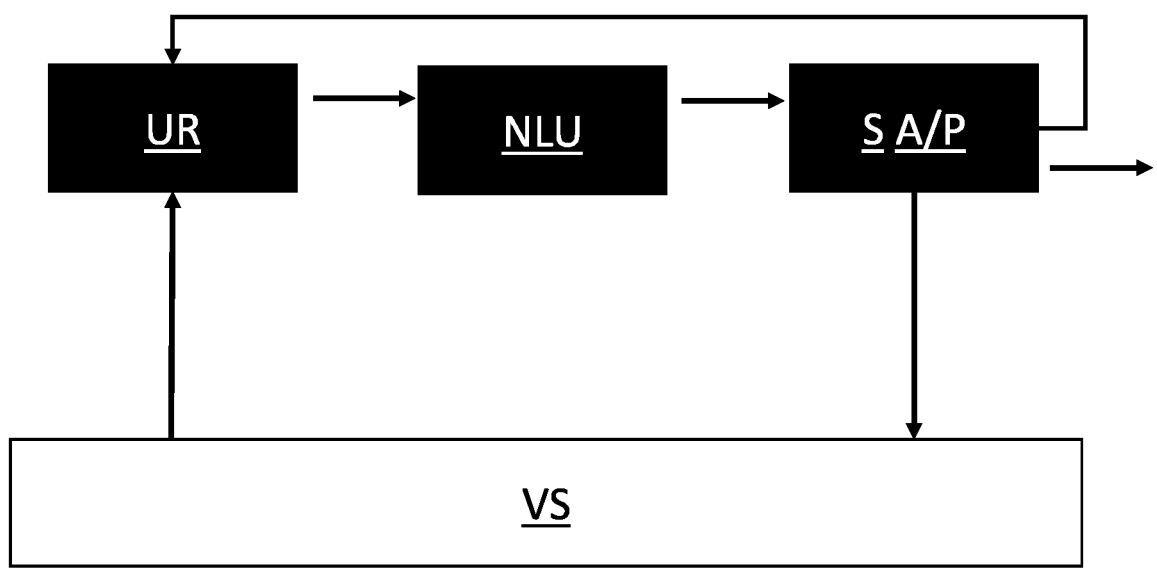
FIG. 3 shows a further example of a system arrangement for efficient dialogue configuration and interpretation in accordance with an aspect of the present invention.

FIG. 3 shows a corresponding system according to the invention, a user request UR being made at the upper left side and being conveyed to an interpretation component, which is referred to herein as a natural language understanding component NLU. Subsequently, an answer or question is generated, this taking place in a further component which is referred to herein as a system answer/prompt S A/P. Subsequently, the method can terminate, this being denoted on the right side by the corresponding arrow to the outside, or else the text response is in turn conveyed to the voice service VS, which converts the text output into speech again and provides it to the user, who can subsequently activate a user input again. The reverse direction is also provided in this drawing. The use case "System asks, user answers" (voice survey) is advantageous. The use of the voice service is not compulsory.

Figure 4:
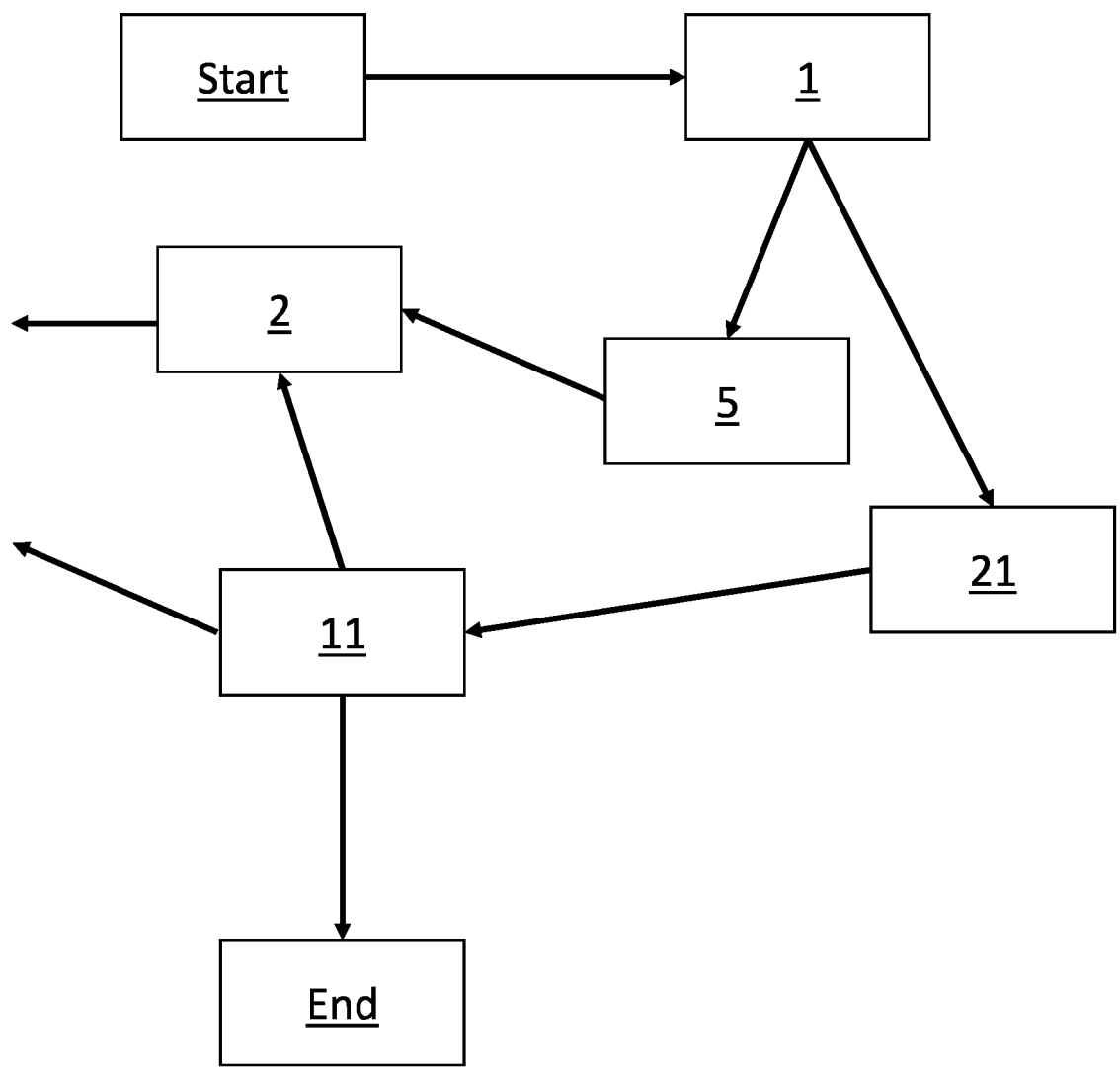
FIG. 4 shows an example dialogue protocol comprising dialogue units in accordance with an aspect of the present invention.

FIG. 4 shows a dialogue protocol along with dialogue units which specify the dialogue sequence. For this purpose, a start-up dialogue unit is illustrated at top left, and subsequently branches into the first dialogue unit. In this context, a user input can be fetched and as a function of the provided answer is referred to dialogue unit 5 or 21. The corresponding dialogue units may be stored in tabular form, it being possible for the numerical index to be a row number. As is shown in the present drawing, dynamic branching is thus possible, and each illustrated box corresponds to a dialogue unit which is assigned to an actor. Thus, it may for example be specified that the dialogue unit 11 is provided by a user, and in a following dialogue unit the dialogue is terminated by the proposed dialogue system. The two arrows on the left side illustrated that more further dialogue units may be provided and that the proposed example of FIG. 4 is merely an extract from a larger-scale dialogue protocol. Since more than two branchings are possible, as well as diagonal steps into another dialogue branch, a branching from 11 back to 2 is also possible. All of this contributes to a good user experience.

Figure 5:
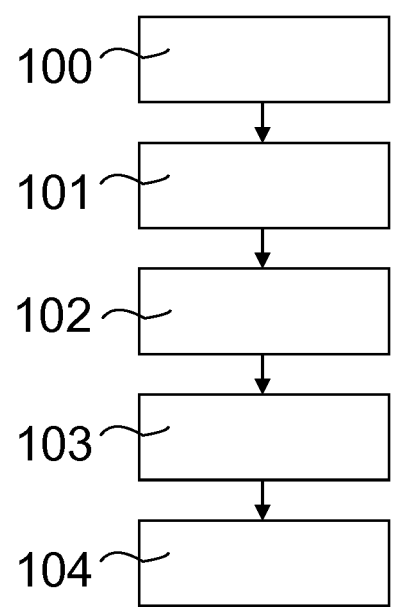
FIG. 5 is a schematic flow chart of the proposed method for efficient dialogue configuration and interpretation in accordance with a further aspect of the present invention.

FIG. 5 is a schematic flow chart showing a method for efficient dialogue configuration and interpretation in a computer-assisted automated dialogue system, storing 100 a plurality of dialogue protocols for in each case at least two keywords, the dialogue protocols each specifying a dynamic sequence of a dialogue and the dynamic sequence of the dialogue describing sub-dialogues which are composed by way of branch points, the dialogue protocol specifying a presence of dialogue units and a dialogue progression which places the dialogue units in time sequence; selecting 101 a dialogue protocol as a function of at least two keywords provided 102 at runtime, at least the first keyword being provided by means of an acoustic user input using a technology for understanding a natural language, which detects from a pitch of the acoustic user input whether this is a question or a statement, and further at least one second keyword is provided by way of a control command, the user selecting at least the first keyword and the control command modelling a context of the selected keyword for this purpose and thus providing the at least second keyword, whereupon the corresponding dialogue protocol is selected; assigning 103 text elements to dialogue units of the dialogue protocol; and executing 104 the dialogue protocol at the runtime.

According to the invention, it is particularly advantageous that the components of a dialogue are stored in a voice dialogue system, and not stored in a hard-coded manner, and dialogue units are unambiguously classified using indexes, making it possible for the source code or script to remain unchanged, and new dialogues can be shown as parameter tables, and dialogues can additionally be ported from one voice dialogue system development environment into the other or made accessible by means of interfaces. In this context, the software need not be changed, and multi-part or recursive dialogues can be executed, it in particular being made possible for the machine to ask and the user to answer.

In one aspect of the present invention, the control program itself has to be ported once for each new development environment, but the DP does not.

Finally, according to the invention it is advantageous that the machine initially asks and subsequently the user answers, and finally the answer is permanently stored (by means of control command). This makes possible the simple implementation of applications which use this dialogue structure, in particular of voice surveys and voice data collections.

The dialogue progression and user inputs may also be permanently stored (on a hard disk or in a database), this being advantageous for voice surveys/data collections.

The invention claimed is:

1. A method for efficient dialogue configuration and interpretation in a computer-assisted automated dialogue system, comprising:
storing a plurality of dialogue protocols, each of the plurality of dialogue protocols causing an action to be executed by the dialogue system, the dialogue protocols each specifying a dynamic sequence of a dialogue and the dynamic sequence of the dialogue describing sub-dialogues which are composed by way of branch points, the dialogue protocol specifying a presence of dialogue units and a dialogue progression which places the dialogue units in a sequential order;
selecting a dialogue protocol based on at least two keywords provided at runtime and based on the sequential order of the at least two keywords, at least a first keyword within the at least two keywords being provided by means of an acoustic user input using a technology for understanding a natural language, which detects from a pitch of the acoustic user input whether the acoustic user input is a question or a statement, and further at least one second keyword is generated at a processor by way of a control command, the user selecting at least the first keyword and the processor generating the at least one second keyword based on the control command modelling a context of the first keyword, the context established prior to a receipt of the acoustic user input, whereupon the dialogue protocol is selected as a function of at least the first keyword and the at least one second keyword;
assigning text elements to dialogue units of the dialogue protocol; and
executing the dialogue protocol at the dialogue system at runtime responsive to receiving the first keyword from the acoustic user input.

2. The method according to claim 1, wherein the dialogue units are stored as alphanumeric parameters.

3. The method according to claim 1, wherein the dialogue units are stored in tabulated form.

4. The method according to claim 1, wherein in each case a dialogue unit specifies an activity of an actuator within the dialogue protocol.

5. The method according to claim 1, wherein a branch point is selected based on at least one of a user input or the control command.

6. The method according to claim 1, wherein each dialogue unit predefines at least one of an activity of the dialogue system, an activity of a user, execution of control commands, or termination of the method.

7. The method according to claim 1, wherein the execution of the dialogue protocol at the runtime comprises operating an acoustic dialogue between the dialogue system and a user.

8. The method according to claim 1, wherein the method is executed on a mobile terminal, in a vehicle or on a stationary computing unit.

9. The method according to claim 1, wherein interfaces to existing internet-based services are provided.

10. A system arrangement for efficient dialogue configuration and interpretation in a computer-assisted dialogue system, comprising:

a memory set up to store a plurality of dialogue protocols, each of the plurality of dialogue protocols causing an action to be executed by the dialogue system, the dialogue protocols each specifying a dynamic sequence of a dialogue and the dynamic sequence of the dialogue describing sub-dialogues which are composed by way of branch points, the dialogue protocol specifying a presence of dialogue units and a dialogue progression which places the dialogue units in a sequential order;

one or more processors set up to select a dialogue protocol based on at least two keywords provided at runtime and based on the sequential order of the at least two keywords, the system being set up to provide at least a first keyword within the at least two keywords by means of an acoustic user input using a technology for understanding a natural language, which is set up to detect from a pitch of the acoustic user input whether the acoustic user input is a question or a statement, and the one or more processors further being set up to generate at least one second keyword by way of a control command, the user selecting at least the first keyword, and the one or more processors to generate the at least second keyword based on the control command modelling a context of the first keyword, the context established prior to a receipt of the acoustic user input, whereupon the dialogue protocol is selected as a function of at least the first keyword and the at least one second keyword; and the one or more processors set up to assign text elements to dialogue units of the dialogue protocol and execute the dialogue protocol at the dialogue system at runtime responsive to receiving the first keyword from the acoustic user input.

11. At least one non-transitory machine-readable storage medium, comprising a plurality of instructions that, responsive to being executed with processor circuitry of a computer-controlled device, cause the computer-controlled device to:

store a plurality of dialogue protocols, each of the plurality of dialogue protocols causing an action to be executed by the computer-controlled device, the dialogue protocols each specifying a dynamic sequence of a dialogue and the dynamic sequence of the dialogue describing sub-dialogues which are composed by way of branch points, the dialogue protocol specifying a presence of dialogue units and a dialogue progression which places the dialogue units in a sequential order;

select a dialogue protocol based on at least two keywords provided at runtime and based on the sequential order of the at least two keywords, at least a first keyword within the at least two keywords being provided by means of an acoustic user input using a technology for understanding a natural language, which detects from a pitch of the acoustic user input whether the acoustic user input is a question or a statement, and further at least one second keyword is generated at a processor by way of a control command, the user selecting at least the first keyword and the processor generating the at least one second keyword based on the control command modelling a context of the first keyword, the context established prior to a receipt of the acoustic user input, whereupon the dialogue protocol is selected as a function of at least the first keyword and the at least one second keyword;

assign text elements to dialogue units of the dialogue protocol; and execute the dialogue protocol at the dialogue system at runtime responsive to receiving the first keyword from the acoustic user input.

* * * * *